United States Patent [19]

Maria-Vittorio-Torrisi

[11] 4,223,838

[45] Sep. 23, 1980

[54] SELF-FLUSHING, CONSTANT FLOW EMITTER FOR A DRIP IRRIGATION SYSTEM

[76] Inventor: Salvatore Maria-Vittorio-Torrisi, Catania, Italy

[21] Appl. No.: 902,488

[22] Filed: May 3, 1978

Related U.S. Application Data

[63] Continuation-in-part of Ser. No. 777,915, Mar. 16, 1977, abandoned.

[30] Foreign Application Priority Data

May 25, 1976 [IT] Italy ................................ 23580 A/76

[51] Int. Cl.² .................... B05B 1/30; B05B 15/02
[52] U.S. Cl. ........................ 239/109; 138/42; 138/46; 239/118; 239/123; 239/533.1; 239/542; 239/570; 251/126

[58] Field of Search .................... 239/106–109, 239/114–118, 123, 271, 272, 533.1, 542, 547, 570, 571; 137/517; 251/126; 138/40, 42, 43, 45, 46

[56] References Cited

U.S. PATENT DOCUMENTS

| | | | |
|---|---|---|---|
| 1,879,197 | 9/1932 | Greenwald | 138/43 |
| 2,613,992 | 10/1952 | Bahnson, Jr. | 239/116 |
| 3,876,155 | 4/1975 | Ruben | 239/542 |
| 3,885,743 | 5/1975 | Wake | 239/123 X |
| 4,036,435 | 7/1977 | Pecaro | 239/542 X |

*Primary Examiner*—Andres Kashnikow
*Attorney, Agent, or Firm*—Huebner & Worrel

[57] ABSTRACT

An improved self-flushing, constant flow emitter particularly suited for use with a drip irrigation system. The emitter includes an internal chamber having a discharge orifice defined therein and a resiliently supported plunger disposed within the chamber adapted to respond to pressure changes for simultaneously metering a flow of water through the orifice and dislodging foreign matter from the orifice.

6 Claims, 10 Drawing Figures

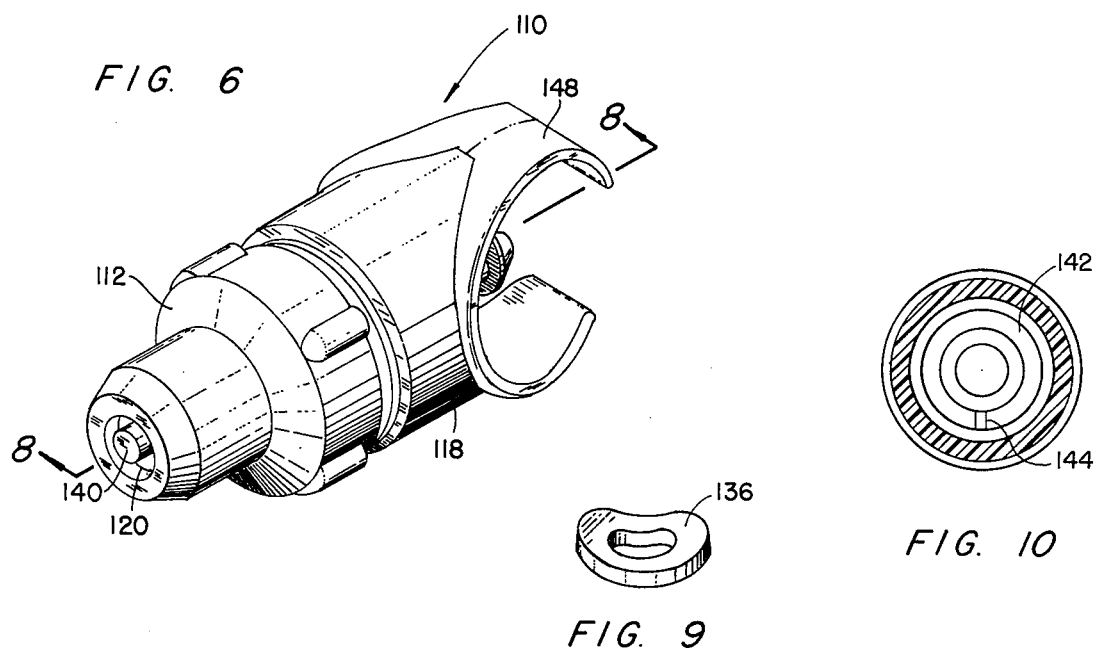
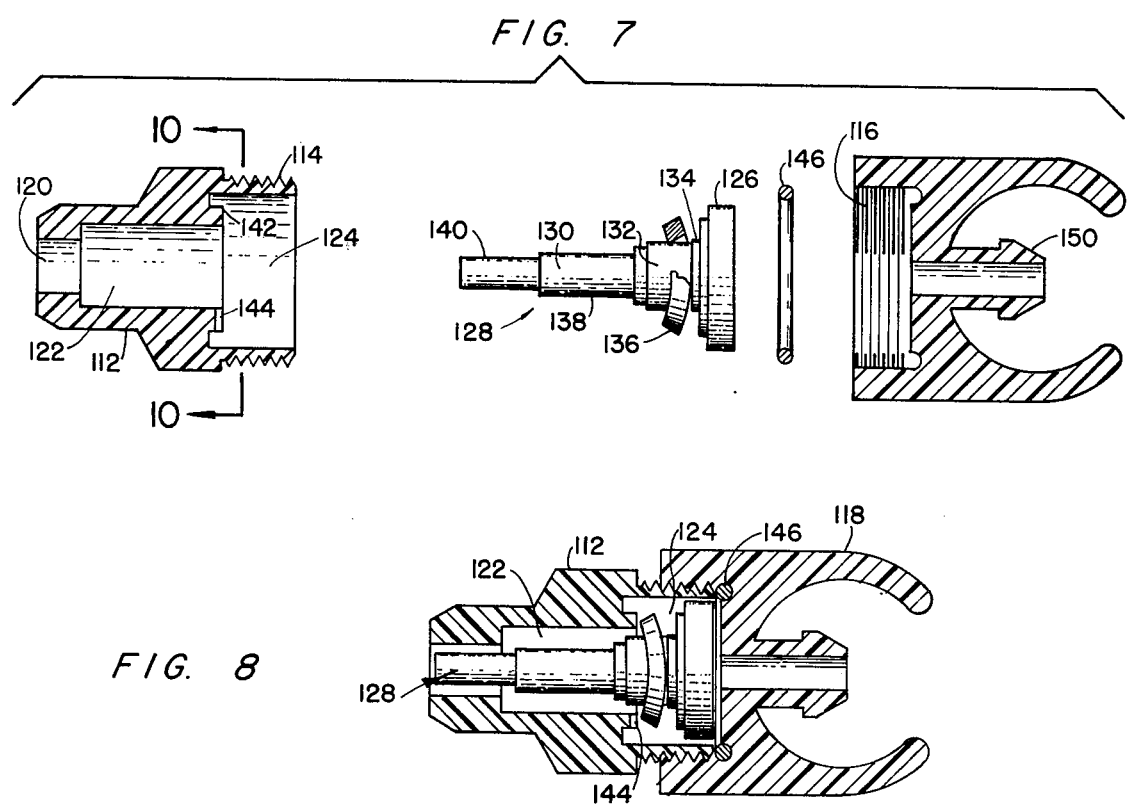

SELF-FLUSHING, CONSTANT FLOW EMITTER FOR A DRIP IRRIGATION SYSTEM

CROSS REFERENCE TO RELATED APPLICATION

This application is a continuation-in-part application of application Ser. No. 777,915, filed Mar. 16, 1977, now abandoned, in which has been filed a certified copy of Italian application number 23580A/76 upon which a claim for priority under 35 U.S.C. 119 is based.

BACKGROUND OF THE INVENTION

1. Field of the Invention

The invention generally relates to irrigation systems and more particularly to a self-flushing, constant flow emitter for a drip irrigation system.

2. Description of the Prior Art

Drip irrigation systems, generally, include trunk lines from which are extended a plurality of mutually spaced lateral lines terminating in emitters. Each emitter serves to discharge water continuously at an extremely low rate in a manner commonly referred to as "dripping". Of course, emitters are known to be generally sensitive to changes in hydraulic head or pressure. Moreover, emitters are particularly vulnerable to the effects of particles of foreign matter such as sand suspended in the water supplied thereto.

As can be appreciated by those familiar with irrigation systems for use in agriculture and related industries, water available for irrigation purposes, particularly in arid regions, frequently is contaminated by particles of sand and contains relatively large quantities of chemicals having a propensity to deposit scale on walls of conduits, emitters and the like. As a consequence, it is precisely in the regions in which irrigation is required that the water employed is less than totally suitable for distribution through emitters.

It is, therefore, the general purpose of the instant invention to provide an improved, simplified emitter for use in agricultural irrigation systems having a capability of achieving a self-flushing, constant rate mode of operation in the presence of fluctuations in hydraulic head pressures, without substantially increasing costs or reducing utility thereof.

OBJECTS AND SUMMARY OF THE INVENTION

It is, therefore, an object of the invention to provide an improved emitter which overcomes the aforementioned difficulties and disadvantages.

It is another object to provide an economic and practical emitter characterized by self-flushing and constant flow capabilities.

It is another object to provide an emitter for use in drip irrigation systems having a capability of dislodging and discharging foreign matter.

It is another object to provide an emitter substantially insensitive to the effects of variations in hydraulic head pressures.

Another object is to provide an improved emitter which is particularly useful in combination with drip irrigation systems, although not necessarily restricted in use thereto since the emitter may be useful when installed in systems adapted to distribute agricultural chemicals and the like in liquid states.

These and other objects and advantages are achieved through the use of a tubular casing having an internal chamber characterized by a discharge orifice defined at one end thereof and an axially displaceable resiliently supported metering plunger disposed within the casing. One embodiment of the invention includes a spring-biased plunger having an abrasive surface for dislodging scale while another includes a foreshortened plunger supported by an axially deformed annulus characterized by a memory, as will hereinafter become more readily apparent by reference to the following description and claims in light of the accompanying drawings.

BRIEF DESCRIPTION OF THE DRAWINGS

FIG. 6 is a perspective view of another embodiment of the invention comprising a foreshortened emitter having a retractable metering plunger supported by an axially deformable actuator ring.

FIG. 7 is an exploded, partially sectioned view of the emitter shown in FIG. 6.

FIG. 8 is a cross sectional view taken generally along line 8—8 of FIG. 6.

FIG. 9 is a perspective view of an actuator provided for displacing the metering plunger shown in FIGS. 7 and 8.

FIG. 10 is a cross sectional view taken generally along line 10—10 of FIG. 7.

DESCRIPTION OF THE PREFERRED EMBODIMENT

First Form

Figure 1:
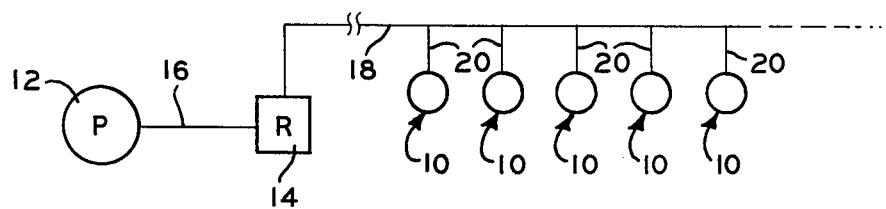
FIG. 1 is a schematic view diagrammatically illustrating a drip irrigation system including a plurality of emitters, each of which comprises one embodiment of the instant invention.
Figure 2:
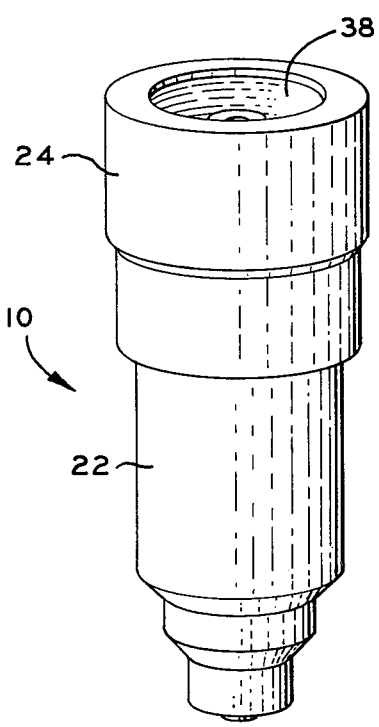
FIG. 2 is a perspective view of one of the emitters schematically illustrated in FIG. 1.
Figure 3:
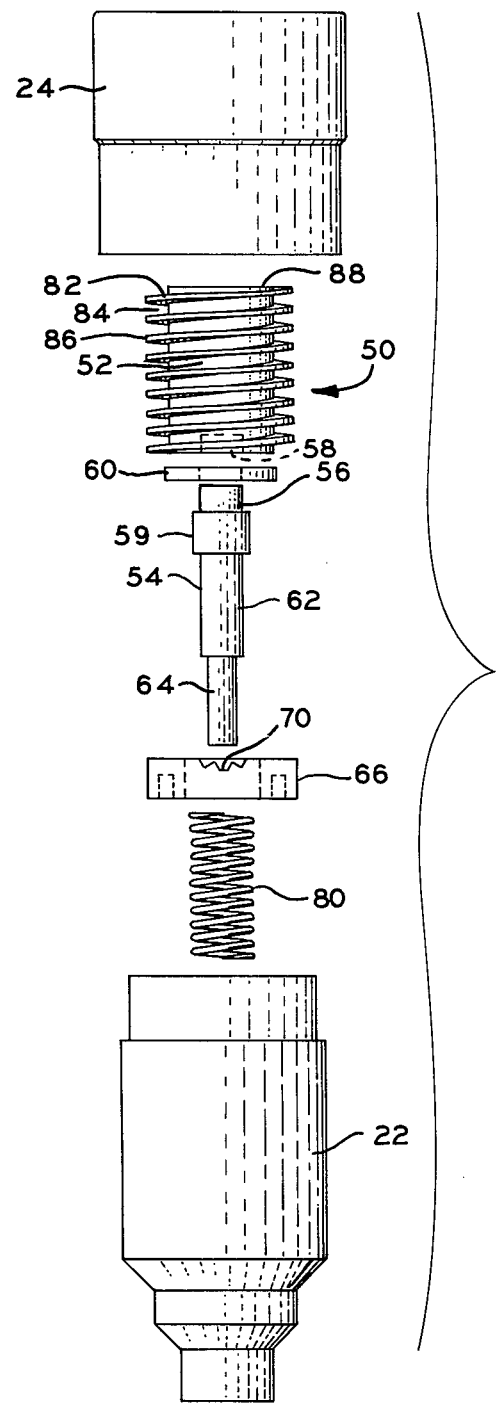
FIG. 3 is an exploded view of the emitter shown in FIG. 2.

Referring now to the drawings wherein like reference numerals designate like or corresponding parts throughout the several views, there is shown schematically in FIG. 1 a drip irrigation system which includes a plurality of emitters, each being generally designated 10.

As illustrated in the drawings, the system also includes a pump 12 connected to a pressure regulator 14 through a feeder line 16. From the regulator 14 there extends a main or trunk line 18 which functions as a manifold, as will become apparent. Affixed to the trunk line 18 in communication therewith there is a plurality of lateral lines, hereinafter referred to as laterals, designated 20. Affixed to each of the laterals 20, at its distal end, is one of the emitters 10, to be employed for distributing water in a manner fully understood by those familiar with drip irrigation systems.

Each of the emitters 10 includes a housing comprising a casing 22 of a generally tubular configuration surmounted by a cap 24. As a practical matter, the cap 24 includes an annular relief 26 for telescopically receiving therein one end of the casing 22. The cap 24 also includes a coupling cavity 28 axially spaced from the relief 26 for receiving an end portion of one of the laterals 20. Where desired, the external surface of the aforementioned end of the casing 22 also is provided with an annular relief 30 having a diameter slightly less than the diameter of the relief 26 for accommodating a telescopic coupling of the cap with the casing. An annular sealing substance 32, such as a film of a suitable adhesive, is interposed between the concentrically related surfaces of the relief 26 and the relief 30. Of course, the particular manner in which a seal is established between the casing 22 and cap 24 is deemed to be a matter of convenience and can be varied as desired.

Figure 4:
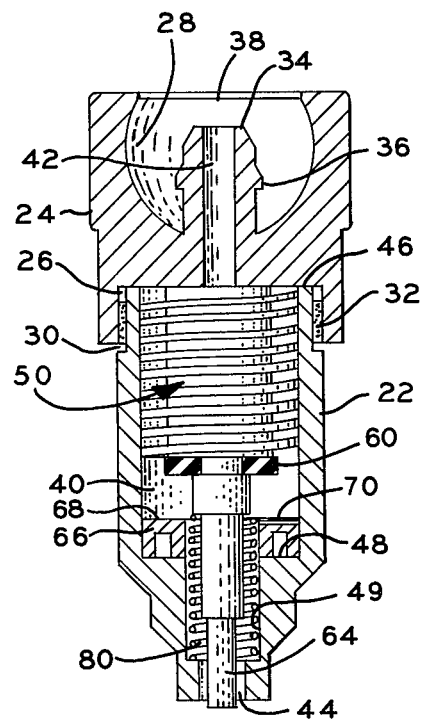
FIG. 4 is a cross-sectional view of the emitter shown in FIGS. 1 and 2.

However, it should be noted that within the coupling cavity 28 there is disposed an axially extended coupling stem 34 having a radially extended lip 36 of a substantially annular configuration. The lip 36 includes a tapered surface for facilitating insertion of the lip into the opening of one end of a lateral 20 and a radial surface for establishing a locking effect therefor. As can be appreciated from a cursory review of FIG. 4, the coupling cavity 28 is of a truncated, spherical configuration and establishes an opening 38 having a diameter slightly less than the diameter of the cavity 28 but greater than the diameter of a lateral 20. Consequently, as an end portion of a lateral is inserted through the opening 38, the coupling stem 34 is received within the end portion of the lateral. The lip 36 causes the end portion of the lateral to expand and substantially fill the cavity 28. Due to the fact that the diameter of the opening 38 is less than the diameter of the cavity 28, a bite is taken on the lateral as the end portion thereof is expanded in response to the insertion of the coupling stem 34. Thus the emitter 10 is jointed to the lateral.

The casing 22 is provided with an internal chamber 40 communicating with a bore 42 extended axially through the coupling stem 34 and a discharge or metering orifice 44, each being disposed in coaxial alignment with the chamber. As a practical matter, the chamber 40 is of a substantially cylindrical configuration and terminates at a transverse planar surface 46 of the relief 26 and at a transverse planar surface 48 machined or otherwise formed in the casing. It will be appreciated that the surfaces 46 and 48 are of substantially annular configurations and are arranged in coaxial alignment for affording ingress and egress of a stream of water relative to the chamber 40. As shown, a cylindrical bore 49 is extended between the discharge orifice 44 and the chamber 40, in coaxial relation therewith whereby communication is established therebetween.

Disposed within the chamber 40 there is a metering plunger, generally designated 50. The plunger 50 includes a piston head 52 from which is extended a coaxially aligned metering pintle comprising a shaft 54 of a generally segmented configuration. While the shaft 54 may be secured to the head 52 in any suitable manner, as shown the metering shaft 54 includes a base segment 56 configured to be received within a bore 58 provided within the piston head 52 for receiving the metering shaft 54 in secured relation therewith.

Immediately adjacent to the base segment 56 of the shaft 54, there is a collar 59 having an annular shoulder axially spaced from the adjacent end surface of the piston head 52. Between the collar 59 and the piston head 52 there is disposed in concentric relation with the shaft 54 a first metering annulus 60. The annulus 60 is formed of a resilient material and is supported by the plunger for axial displacement, for reasons which will hereinafter become more readily apparent.

In axially spaced relation with the base segment 56 the shaft 54 includes an intermediate segment 62 having a diameter substantially equal to the diameter of the base segment of the shaft. In juxtaposition with the intermediate segment 62, there is a distal segment 64, the diameter of which is slightly less than the diameter of the intermediate segment 62 and slightly less than the diameter of the orifice 44. It is to be understood that the greatest diameter of the metering shaft 54, at any segment, is less than the diameter of the bore 49. Thus axial displacement of the plunger 50 within the bore 49 is accommodated.

Figure 5:
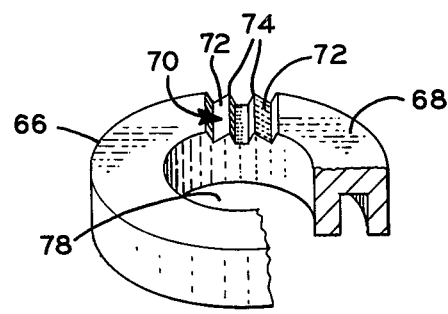
FIG. 5 is a fragmented, partially sectioned, perspective view of a metering annulus included within the emitter shown in FIGS. 1 through 4.

Seated on the surface 48, within the chamber 40, there is a second metering annulus 66 formed of a substantially rigid material. As best shown in FIG. 5, the annulus 66 includes a planar face 68. The outside diameter of the second metering annulus 66 is substantially equal to the inside diameter of the chamber 40 whereby a seal is established between the adjacent surfaces thereof.

Extended radially across the face 68 of the second metering annulus 66 there is a segmented slot 70. This slot includes paralleling segments 72 separated by a pair of ridges 74 extended in mutual parallelism. In effect, each segment 72 extends from the wall of the chamber 40 to a center opening, designated 78, as provided for the second metering annulus 66. Thus multiple path segments for a stream of water may be established across the face 68 of the metering annulus.

It should be noted that the diameter of the center opening 78 is substantially equal to the diameter of the bore 49 so that, in effect, the opening 78 comprises an extension of the bore 49. Hence, it will be appreciated that reciprocation of the shaft 54 through the opening 78 is thus facilitated.

Disposed within the bore 49 and extended into the opening 78 of the second metering annulus, there is compression spring 80 of a substantially helical configuration. As a practical matter, the internal diameter of the spring 80 is slightly less than the diameter of the collar 59. Thus the collar is caused to engage the end surface of the spring 80 as the plunger is advanced toward the orifice 44.

It should, of course, be apparent that the compression spring 80 continuously urges the plunger 50 in retracting displacement relative to the orifice 44. It is to be understood, however, that the distal segment 64 of the metering shaft 54 is never extracted from the orifice 44 but simply reciprocates therein as the emitter 10 is employed in an operative environment.

Extended along the external surface of the piston head 52 there is a helical rib 82 which serves to define a helical passageway along the periphery of the piston head 52. It is to be understood that the rib 82 frictionally engages the surface of the internal wall of the chamber 40 and that the rib 82 is transversely flat, whereby a pair of relatively sharp shoulders 86 is provided in contiguous relation with the wall of the chamber 40. Thus the shoulders serve as cutting surfaces for the scraping scale formed on the surface of the internal wall of the chamber. Consequently, the rib 82 acts as an abrasive surface for scouring the cylindrical surface of the wall of the chamber 40 as axial reciprocatory displacement is imparted to the plunger 50.

Axial displacement of the plunger 50 is, in operation, imparted thereto in response to changes in the hydraulic head pressure of water admitted to the chamber 40 through the bore 42 of the coupling stem 34. The water, of course, acts against the surface of the rib 82, but acts primarily against a transverse surface 88 provided for the head 52 in communication with the bore 42. The force thus applied to the piston head serves to displace the plunger 50 against the applied forces of the spring 80. As hydraulic head pressures within the laterals 20 are reduced, the spring 80 becomes effective for returning the plunger 50 to its initial position. Thus the plunger 50 is reciprocated in response to changes in pressures of the water supplied via the laterals 20.

It will be appreciated, of course, that not only do hydraulic head pressures vary in response to fluctuation in the output from the regulator 14, variations also result from changes in rates of flow or discharge from the emitter 10. Hence, increase in hydraulic head pressure may result from clogging of the emitters 10, while reduction therein may occur in response to the clearing thereof.

Second Form

Reference now is made to FIGS. 6 through 10, wherein is illustrated a further embodiment of the invention, generally designated 110.

The emitter 110 also is adapted to be coupled within a system such as that schematically depicted in FIG. 1. It is noted that the emitter 110 includes a housing comprising a casing 112 of a generally tubular configuration having an external, helical thread 114 comprising a male thread disposed adjacent to one end thereof. This thread is adapted to be received within a female thread 116 of a removable cap 118 provided for closing the emitter 110.

In practice, the emitter 110 is fabricated from a suitable synthetic resin such as polyethylene or the like utilizing suitable techniques well understood by those familiar with techniques employed in working plastics and similar materials.

The casing 112, as best illustrated in FIGS. 7 and 8, is provided with a discharge orifice, designated 120, coaxially aligned with a chamber 122. The chamber 122 serves as a reservoir for fluid, such as water delivered under pressure to be discharged from the emitter in a dripping mode.

Disposed in coaxial alignment with the chamber 122 there is a piston chamber 124. This chamber receives and houses a piston head 126 of a metering plunger, generally designated 128. The metering plunger 128 functions in substantially the same manner as the metering plunger 50, aforedescribed.

As best shown in FIG. 8, the piston head 126 is of a diameter substantially less than the diameter of the chamber 124 and is affixed to a metering shaft 130 extended axially therefrom. As a practical matter, the shaft 130 includes a base segment 132, of a diameter less than that of the piston head 126 and is spaced therefrom a distance sufficient to establish a shoulder 134 provided for supporting an actuator 136. The actuator 136 is hereinafter more fully described.

The metering shaft 130 also includes a segment 138 interposed between the shoulder 134 and a distal end portion, designated 140. The segment 140 is of a diameter substantially less than the internal diameter of the discharge orifice 120 and functions in a manner and for a purpose similar to that of the segment 64 of the metering plunger 50 previously discussed.

Located within the chamber 124, in concentric relation with the axis of the chamber 122 there is an annulet 142. The annulet is provided with a radial groove 144, the purpose of which is to establish a fluid passageway across the surface of the annulet. The annulet 142, as shown, is disposed within the path of the actuator 136 as the metering plunger 128 is advanced toward the chamber 120. Consequently, the actuator 136 seats on the annulet 142 as the metering shaft 130 is extended into the metering orifice 120, whereupon the radial groove 144, in effect, assures that constant communication is maintained between the chamber 122 and 124. Thus an established flow of water, or other fluid, through the emitter remains uninterrupted, even though minimized.

In practice, the actuator 136 comprises a permanently deformed annular body and is formed of a resilient material having a memory. It will be apparent that as the metering plunger is advanced sufficiently to seat the actuator against the annulet the actuator is flexed and a reactive force thus is developed in the actuator 136. The reactive force causes the actuator to seek to return to its original or permanently deformed configuration. As the actuator seeks to return to its original configuration the piston head 126 is retracted away from the annulet 142 thereto in response.

At this juncture, it is noted that an O-ring 146 is provided for establishing a seal between the cap 118 and the casing 112. Additionally, it is noted that the cap 118 includes a pair of curved tines 148 and a puncture stem 150. In practice, the tines 148 capture a length of the plastic tubing designated while the puncture stem 150 extends through the wall of the tubing for establishing communication between the interior of the tubing and the interior of the emitter 110.

In view of the foregoing, it should now be apparent that water or another liquid is introduced to the emitter through the puncture stem 150. Eventually, the liquid passes through the chambers 122 and 124 and, finally, through the metering orifice 120 in a dripping mode. The flow-rate of liquid through the emitter 110 is determined by the axial position of the piston head 126, relative to the annulus 142, and the position of the piston head 126 is, in turn, determined by the forces applied to the piston head by the liquid introduced to the emitter. Of course, axial displacement of the metering plunger 128, in response to changes in forces applied to the piston head, serves to impart reciprocation to the plunger 128 for thus assuring that the metering orifice 120 remains free of sand and other debris, in a manner similar to that in which the discharge orifice of the aforementioned emitter 10 remains free of sand.

OPERATION

It is believed that in view of the foregoing description of the embodiment of the invention shown in FIGS. 1 through 5, the operation thereof is readily apparent. However, in the interest of completeness the operation of this embodiment is at this point reviewed.

With each of the emitters 10 assembled in the manner hereinbefore described, a coupling of the emitters with end portions of the laterals is achieved by inserting the end portions into the openings 38 with sufficient force to cause the coupling stems 34 of the caps 24 to penetrate the end portions of the laterals 20. Of course, as the end portion of each lateral is received by a penetrating coupling stem 34, the end portion of the lateral is responsively expanded. Thus the end portion becomes lodged within the coupling cavity 28 as a purchase is taken thereon at the opening 38 of the cavity.

During periods of operation, water under pressure is introduced into the chamber 40, via the bore 42. The plunger 50 is forced to advance away from the end surface 46 of the chamber in response to the force of the hydraulic head, against the applied forces of the spring 80. This displacement permits a stream of water to flow through the helical passageway 84 defined by the rib 82. The stream exits the passageway and flows to the discharge orifice 44 through the bore 49. As pressure of the hydraulic head is increased in the lateral 20, the plunger 50 is further advanced against the applied forces of the helical spring 80 for thus causing the segmented metering shaft 54 to advance with respect to the discharge orifice 44. Continued advancement of the plunger permits the first metering annulus 60 to seat against the face 68 of the second metering annulus 66. Due to the fact that the diameter of the first metering annulus 60 is less than the diameter of the second metering annulus 66, an annular chamber, not designated, is established about the periphery of the first metering annulus 60. This chamber continuously communicates with the center opening 78 of the first annulus 60 via the slot 70. However, as pressure resulting from the hydraulic head is increased in the lateral 20 for thus applying an extensive force to the plunger 50, the first metering annulus 60, due to the resiliency of the material from which it is formed, begins to constrict the segments 72 of the slots 70. Thus the cross-sectional dimension of each of the segments is reduced. However, since the pressure resulting from the hydraulic head is increased, velocity of the stream also is increased so that the quality of the stream remains substantially constant.

The compression spring 80 throughout the operation of the emitter continuously applies a retracting force against the plunger 50 thus tending to displace the first metering annulus 60 out of engagement with the face 68 of the second metering annulus 66. In the event pressure within the lateral 20 drops sufficiently to permit the spring to advance the plunger 50 in a retracting direction, the dimensions of the slots 70 are increased as disengagement between the annuli 60 and 66 is initiated. Thus the cross-sectional dimensions of the segments 72 of the slot 70 are increased for accommodating a flow of water under reduced pressure.

In view of the foregoing, it should readily be apparent that each of the emitters 10 is characterized by a capability of achieving substantial constant flow in response to changes in pressures within the lateral 20, due to the fact that changes in the instantaneous cross-sectional area of the slot 20 are inversely proportional to changes in hydraulic head pressures found within the lateral.

In the event sand or other foreign material lodges in the orifice 44, movement of the distal end portion 64 of the metering shaft 54 serves to dislodge foreign matter so that it is discharged with the stream of water. Finally, due to the fact that the slot 70 in effect serves to control the quality of water through the emitter 10 and this slot is opened in response to reduction in pressures within the lateral 20, as the spring 80 lifts the first metering annulus 60, deposit of foreign matter in the slot 70 also is precluded.

Moreover, due to an inherent scouring effect of the rib 82, as it acts against the surface of the internal wall of the chamber 40, build up of scale substantially is precluded, since the rib establishes an abrasive surface which continuously scours the internal surface of the chamber for thus avoiding a deposit of scale on the wall.

In view of the foregoing it should be apparent that flushing of each emitter 10 is readily achieved simply by reducing the pressure within the associated lateral 20. Moreover, a substantially constant flow of water through the emitter is substantially assured for all operating hydraulic head pressures found within the lateral 20, due to the fact that the cross-sectional area of the slot 70 varies inversely with changes in head pressures.

Referring now to the embodiment of the invention shown in FIGS. 6 through 10, it is to be understood that the emitter 110 functions in a manner similar to that which the emitter 10, aforedescribed, functions for purposes of accommodating a discharge of water at low flow rates in a drip mode.

With the emitter 110 assembled in the manner hereinbefore described, it is prepared to be connected with a source of liquid, such as water under pressure. The connection is established through the use of a length of plastic pipe received within the pair of tines 148 and the puncture stem 150. The pressure of the water delivered to the chamber 124 causes the metering plunger 128 to advance axially toward the chamber 122 for causing the actuator 136 to seat against the annulet 142. The water introduced into the chamber 124, of course, bypasses the piston head and the actuator, around the peripheries thereof to be deposited in the chamber 124. From the chamber 124 the water passes through the radial groove 144 and into the chamber 122. From the chamber 122 the water is delivered through the orifice 120.

It will be appreciated that as the pressure for the water supply increases, the piston head 126 travels toward the annulet 142 whereupon the actuator 136 is further deformed and caused to flatten against the annulet 142. However, it should further be appreciated that the flow through the emitter is maintained uninterrupted, although restricted by the radial groove 144.

Reduction in the pressure for water delivered to the chamber 144 permits the actuator 136 to force the plunger to retract toward its original position and thus move surfaces of the actuator from the annulet 142. As the surfaces of the actuator are thus moved the cross sectional dimension of passage for water through the emitter increases.

In view of the foregoing, it should now be apparent that the emitter 110 comprises a simplified emitter of a substantially reduced size and complexity.

Although the invention has been herein shown and described in what are conceived to be the most practical and preferred embodiments, it is recognized that departures may be made therefrom within the scope of the invention, which is not to be limited to the illustrative details disclosed.

Having described my invention, what I claim as new and desire to secure by Letters Patent is:

1. An improved emitter having particular utility in a drip irrigation system comprising:
   A. a tubular casing characterized by an internal pressure chamber;
   B. means for delivering water under pressure to said chamber and means including an orifice for discharging water from said chamber; and
   C. means responsive to changes in pressure of water within said chamber for substantially maintaining the rate at which water is discharged from said orifice including a pressure responsive plunger comprising a piston head supported for reciprocating displacement within said chamber in coaxial alignment with said orifice and having a helical rib extended along the surface thereof, disposed in engaged relation with said tubular casing throughout the length thereof defining a multiple-turn path of a constant-length circumscribing the head, a shaft extended from said piston head into said orifice, a spring continuously urging said plunger in axial displacement away from said orifice, flow control means including a first annulus disposed in spaced concentric relation with said shaft having defined therein a metering slot communicating with said chamber and radially extended across one face thereof defining a stream path, and means including a second annulus formed of resilient material mounted on the shaft in concentric relation therewith for engaging the face of said first annulus in response to axial displacement imparted to said plunger against said spring for restricting said stream path.

2. The emitter of claim 1 wherein the shaft is of a segmented configuration and includes a first segment characterized by a diameter slightly less than the diameter of the first annulus, a second segment characterized by a diameter slightly less than the diameter of said first annulus, and a third segment characterized by a diameter slightly less than said second diameter of the diameter of said orifice.

3. The emitter of claim 1 further including a tubular bore extended in coaxial alignment between said orifice and said first annulus defining a tubular conduit extended from the center opening of said first annulus and said orifice, and for receiving said spring in concentric relation with said metering shaft.

4. The emitter of claim 3 wherein said slot comprises multiple segments extended in mutual parallelism.

5. In an emitter, the improvement comprising:
A. a tubular casing including a first and a second chamber arranged in communicative coaxial alignment, the diameter of the first chamber being substantially less than the diameter of the second chamber;
B. a metering orifice defined in the casing in coaxial alignment with said chambers;
C. a metering plunger characterized by a piston head and a metering shaft suspended axially therefrom, said piston head being seated in said second chamber and said shaft being extended into said metering orifice;
D. means defining an annular member projected axially into the second chamber having a radial groove defining a passage-way extending between the first and second chambers; and
E. means concentrically related to the longitudinal axis of the casing for continuously urging the metering plunger in axial retraction away from the metering orifice comprising an annular body formed of an elastomeric material and having a compound curve at-rest configuration mounted on the metering shaft in interposed relation with said annular member and said piston head adapted to engage the piston head and the annular member simultaneously and achieve a stressed state in response to the piston head being advanced toward the annular member for urging the piston head of said plunger in axial displacement away from said annular member.

6. The emitter of claim 5 wherein said emitter further includes a pair of tines for coupling the emitter to a length of flexible tubing.

* * * * *

UNITED STATES PATENT AND TRADEMARK OFFICE
CERTIFICATE OF CORRECTION

PATENT NO. : 4,223,838
DATED : September 23, 1980
INVENTOR(S) : Salvatore Maria-Vittorio-Torrisi It is certified that error appears in the above–identified patent and that said Letters Patent are hereby corrected as shown below:

Column 7, lines 27 and 28, delete "quality" and insert

---quantity---;

line 54, delete "quality" and insert ---quantity---.

Signed and Sealed this

Sixteenth Day of December 1980

[SEAL]

Attest:

SIDNEY A. DIAMOND

Attesting Officer

Commissioner of Patents and Trademarks